Aug. 29, 1967  J. G. DORRANCE  3,338,181
BUMPER CONTROLLED DRAGLINE TOW PIN
Filed June 16, 1964
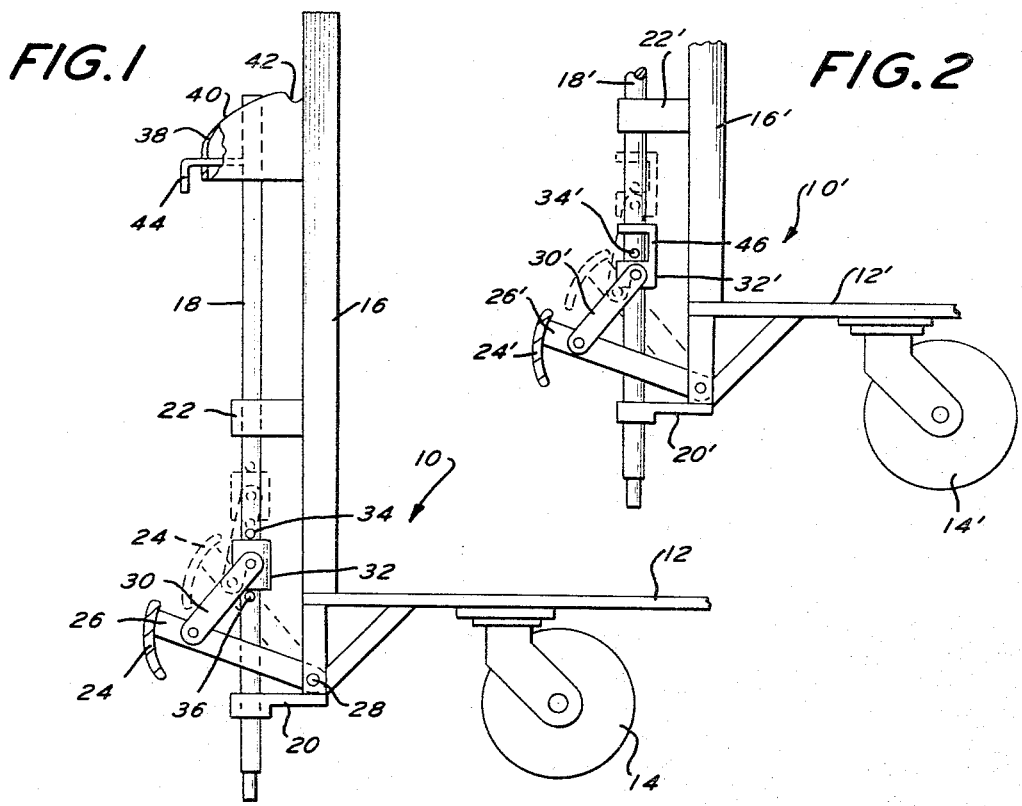
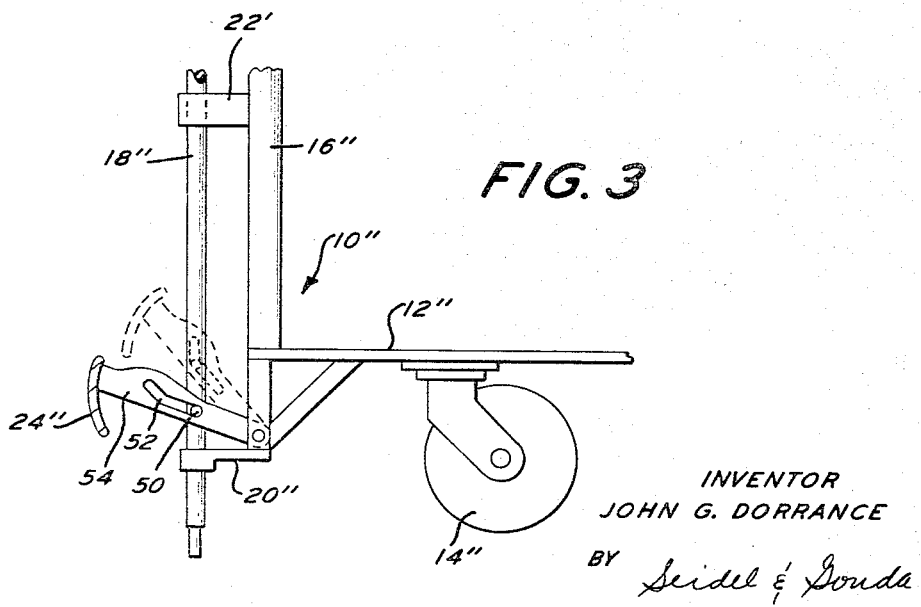
INVENTOR
JOHN G. DORRANCE
BY Seidel & Gonda
ATTORNEYS.

United States Patent Office 3,338,181
Patented Aug. 29, 1967

3,338,181
BUMPER CONTROLLED DRAGLINE TOW PIN
John G. Dorrance, Phillipsburg, N.J., assignor to SI Handling Systems, Inc., Easton, Pa., a corporation of Pennsylvania
Filed June 16, 1964, Ser. No. 375,457
4 Claims. (Cl. 104—178)

This invention relates to a dragline material handling truck and, more particularly, to a truck which is adapted to be towed by means of a tow pin extending through a main slot in or above a floor so that the truck may be automatically directed to a pre-selected slot which intersects with the main slot.

Dragline material handling trucks have been proposed heretofore. Thus, see Patents 2,619,370 and 3,103,895 which are exemplary of trucks corresponding to the type of truck to which the present invention applies. In each of said patents, there is illustrated a dragline material handling truck having an accumulation bumper which can be actuated to cause the tow pin to be raised a predetermined distance.

The tow pin is generally supported in an upright direction at the front end of the truck. When raised through said predetermined distance by actuation of the accumulation bumper, the lowermost end of the tow pin is in a plane whereby it will be free from contact with a pushing dog or other structure associated with the dragline. Hence, the truck may accumulate along the main slot or shunt slot as desired. In Patent 3,103,895, for example, there is illustrated a generally semicircular latch plate which is structurally interrelated with a handle on the upper end of the tow pin structure whereby the tow pin may be manually moved to an inoperative position. In the inoperative position, the tow pin is raised sufficiently so as to be out of the main slot and thereby facilitate manual pushing of the truck without contact between the lowermost end of the tow pin and any abutments or projecting surfaces on the floor. The tow pin will be in its inactive position, for example, when the truck is being stored in a warehouse or the like.

In the trucks of the above-mentioned patents, the accumulation bumper is in its forward position at all times except when it has contacted an abutment and is caused to move to a rearward position. In accordance with the present invention, means are provided structurally interrelating the accumulation bumper and the tow pin structure whereby they function as disclosed in said patents. In addition, such means causes the accumulation bumper to remain in its rearmost position when the tow pin structure has been manually moved to its inoperative position. Thus, the present invention results in the truck occupying a smaller amount of floor space than the trucks known heretofore, such as the trucks in said patents.

I have found that the present invention reduces the amount of floor space needed for a single truck by as much as one square foot. In many installations, there are up to 500 or more trucks stored in a particular warehouse. The present invention will under such circumstances reduce the floor storage space by 500 square feet, which results in a direct saving to the user or enables the user to store a larger number of trucks in the same amount of space. This desirable result is obtained in a manner which is simple and inexpensive while making it easier for a worker to push the truck since the truck is normally pushed from the front end. That is, the forwardly projecting accumulation bumper limits the extent to which the operator may approach the truck and yet be required to push the truck. By structurally interrelating the tow pin structure and the accumulation bumper in a manner whereby the accumulation bumper assumes its rearmost position when the tow pin structure is in its inoperative position, the worker may stand closer to the truck when pushing the same.

It is an object of the present invention to provide a novel dragline material handling truck.

It is another object of the present invention to provide a dragline material handling truck having a tow pin structure interrelated with an accumulation bumper in a novel manner.

It is another object of the present invention to provide a material handling truck having an accumulation bumper structurally interrelated with tow pin structure whereby the accumulation bumper is caused to remain in its rearmost position when the tow pin structure is in its inoperative position.

It is another object of the present invention to provide a dragline material handling truck having an accumulation bumper and tow pin structure interrelated in a manner which results in reduction of storage floor space needed for the truck.

It is another object of the present invention to provide a dragline material handling truck which can be more easily pushed by a worker since the worker may more closely approach the truck during such pushing of the same.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a diagrammatic illustration of the front end of a truck in accordance with one embodiment of the present invention.

FIGURE 2 is a view similar to FIGURE 1 but illustrating another embodiment of the present invention.

FIGURE 3 is a view similar to FIGURE 2 but illustrating another embodiment of the present invention.

Referring to the drawing in detail, wherein like numerals indicate like elements, there is shown in FIGURE 1 a diagrammatically illustrated front end of a dragline material handling truck designated generally as 10. The truck 10 is utilized in a manner well known to those skilled in the art and more specifically illustrated, for example, in the above-mentioned patents. Hence, it is not deemed necessary to illustrate the floor or other supporting surface having a main slot intersected by shunt slots at spaced points along the main slot.

Since the dragline material handling truck has been fairly widely adopted in industry and its general characteristics are well known to those skilled in the art, the illustration of the truck and the description hereinafter will be particularly directed to the novel features of the truck in accordance with the present invention. Thus, the truck 10 includes a platform 12 which is supported by a plurality of wheels 14. Generally, the platform 12 is provided with four such wheels which are adapted to ride on a floor or other supporting surface. The truck 10 is provided with an upright portion 16 at the front end of the platform 12. Upright portion 16 may be a solid wall as illustrated in Patent 2,619,370, or may be a frame construction as illustrated in Patent 3,103,895. The latter is preferred. Generally, the nature of the upright portion 16 is dictated by the nature of the material being supported on the truck 10 and assumes a wide variety of configurations.

The truck 10 is provided with an upright tow pin 18 forwardly of the portion 16 and substantially equidistant from its sides. The tow pin 18 is guided for movement by brackets 20 and 22 projecting forwardly of the portion 16. The lowermost end of the tow pin 18 is adapted to extend into a main slot for engagement with a pusher dog as disclosed in the above-mentioned patents and well known to those skilled in the art. The tow pin 18 is adapted to be raised from its driving position wherein its lowermost end contacts the pusher dog to an intermediate position by an accumulation bumper means. Hereinafter, the intermediate position may be referred to as a second position and said driving position may be referred to as a third position.

The accumulation bumper means illustrated in FIGURE 1 includes bumper 24 connected to one end of a link 26. The other end of link 26 is rotatably supported by a depending portion from the platform 12 for rotation about pin 28. The axis for such rotation of link 26 is transversely of the truck 10.

Said bumper means also includes a link 30. Link 30 has one end rotatably connected to link 26. The other end of link 30 is rotatably connected to a sleeve 32. Sleeve 32 embraces tow pin 18 between abutments 34 and 36 on the latter. As the bumper 24 moves from the solid line position to the phantom position in FIGURE 1, the sleeve 32 contacts the abutment 34 and raises the tow pin 18 to its intermediate position whereby the lowermost end of the tow pin 18 is free from contact with a pusher dog associated with the dragline.

The truck 10 is provided with a guide latch plate 38 which is generally semicircular and projecting forwardly of the upright portion 16. The latch plate 38 is provided with a contoured surface 40. Contoured surface 40 includes a notch 42 at its uppermost end and an intermediate portion which receives the handle 44 on the tow pin 18 when the tow pin 18 is in its lowermost position. The handle 44 may be manually grasped and moved to a position wherein it is received in the notch 42. When handle 44 is in notch 42, the tow pin 18 is in its inoperative position whereby the truck 10 may be manually pushed wherever desired or stored. That is, the tow pin 18 will be raised above its intermediate position resulting from actuation by the accumulation bumper. Generally, actuation of the accumulation bumper 24 only raises the tow pin 18 for a sufficient distance whereby the lowermost end of the tow pin 18 is approximately in the plane of the floor or other supporting surface.

When the handle 44 has been moved to the position wherein it is received in the notch 42, pin 36 engages the lowermost surface of the sleeve 32 and retains the accumulation bumper 24 in its rearward position illustrated in phantom in FIGURE 1. Hence, the truck 10 will occupy a smaller amount of floor space and the worker may stand closer to the front end of the truck 10 when manually pushing the same. At the same time, the truck 10 has all of the advantages of the accumulation bumper. In view of the above remarks, it is not deemed necessary to further describe the operation of the truck 10.

In FIGURE 2, there is illustrated a dragline material handling truck designated generally as 10'. The truck 10' is identical with the truck 10 except as will be made clear hereinafter. Thus, corresponding structure on the truck 10' is provided with corresponding primed numerals and need not be discussed in detail in view of the above description.

In truck 10', a single abutment designated 34' is provided on the tow pin 18' above the sleeve 32'. The sleeve 32' is provided with an extension 46 which projects over and is spaced from the abutment 34'. When the accumulation bumper 24' is caused to move to its rearward or phantom position, sleeve 32' contacts abutment 34' and raises the tow pin 18' to its intermediate position. When the tow pin 18' is manually moved by means of its handle to its inoperative position as described above, upward movement of the tow pin 18' causes the abutment 34' to contact a portion of extension 46 thereby causing the accumulation bumper 24' to move to its phantom or rearward position. The truck 10' is otherwise identical with truck 10 and hence need not be described in further detail.

In FIGURE 3, there is illustrated a dragline material handling truck 10''. Truck 10'' is identical with truck 10 except as will be described hereinafter. Hence, corresponding elements of truck 10'' are provided with corresponding double primed numerals. In place of link 26, the accumulation bumper 24'' is supported by link 54. Link 54 is rotatably supported at one end by the depending bracket from the platform 12''. Link 54 is provided with an elongated slot 52.

It will be noted that the longitudinal axis of slot 52 is slightly curved and off-set with respect to the longitudinal axis of the link 54. An abutment 50 on the tow pin 18'' projects into the slot 52.

When the accumulation bumper 24'' moves to its rearward or phantom position, the surfaces of the slot 52 cam the tow pin 18'' upwardly to its intermediate position. When the tow pin 18'' is manually moved to its inoperative position as described above, the relationship between the abutment 50 and slot 52 results in the accumulation bumper 24'' moving to its rearward or phantom position and remaining there so long as the tow pin 18'' remains in its inoperative position. Due to the above remarks, a further description of the truck 10'' is not deemed necessary.

In each of the embodiments of the present invention, there is disclosed a vehicle having a wheeled body which includes an upright portion at a front end thereof. A tow pin is supported in an upright position by the upright portion of the vehicle. In each embodiment, there is provided an accumulation bumper mounted for movement between a forward and a rearward position. As each bumper moves to its rearward position, the tow pin is caused to be raised. In each embodiment, the tow pin and the bumper are structurally interrelated in a manner whereby the bumper will be retained in its rearward position when the tow pin is in an inoperative raised position.

The present invention may be embodied in other specific forms without departing from the spirit or essential attributes thereof and, accordingly, reference should be made to the appended claims, rather than to the foregoing specification as indicating the scope of the invention.

It is claimed:

1. A dragline material handling truck comprising a body having wheels adapted to roll on a surface below said body, an upright portion of the front end of said body, tow pin structure mounted thereon supported by said truck and guided by said upright portion adapted to cooperate with a dragline for propelling said body, means supporting said tow pin structure in an upright position forwardly of said portion, and accumulation bumper means mounted on said front end and mounted for movement between a forward position and a rearward position, means structurally interrelating said bumper means and said tow pin structure so that when the tow pin structure is raised the bumper means is moved toward its rearward position, interconnecting means for retaining the bumper means in its rearward position when the tow pin structure is in an inoperative raised position, said interconnecting means being an abutment on said tow pin structure for cooperation with a portion of said bumper means, said bumper means including a member having an elongated slot therein, said abutment on said tow pin structure extending into said slot, said slot being at least partially defined by a cam surface for cooperation with said abutment for effecting movement of said bumper means to its rearward position when said tow pin structure is moved to said inoperative raised position, said abutment being adapted to contact said cam surface upon movement of said bumper means to its rearward position to effect movement of said tow pin structure to said inoperative raised position.

2. A truck in accordance with claim 1 wherein said bumper means is mounted for rotational movement about a horizontal axis extending transversely across said body.

3. A dragline material handling truck comprising a body having wheels adapted to roll on a surface below said body, an upright portion on the front end of said body, tow pin structure mounted on and supported by said truck and guided by said upright portion adapted to cooperate with a dragline for propelling said body means supporting said tow pin structure in an upright position forwardly of said portion, and accumulation bumper means mounted on said front end and mounted for movement between a forward position and a rearward position, means structurally interrelating said bumper means and said tow pin structure so that when the tow pin structure is raised the bumper means is moved toward its rearward position, interconnecting means for retaining the bumper means in its rearward position when the tow pin structure is in an inoperative raised position, said interconnecting means being an abutment on said tow pin structure for cooperation with a portion of said bumper means, said bumper means including a sleeve, said sleeve being provided with an extension which is spaced from said abutment, said abutment being between the sleeve and extension and adapted to contact sleeve upon movement of said bumper means to its rearward position, said abutment being adapted to contact said extension of said sleeve for effecting movement of said bumper means to its rearward position when said tow pin structure is moved to said inoperative raised position.

4. A truck in accordance with claim 3 wherein said bumper is mounted for rotational movement about a horizontal axis extending transversely across said body.

References Cited

UNITED STATES PATENTS

| | | | |
|---|---|---|---|
| Re. 25,723 | 2/1965 | Bradt et al. | 204—88 |
| 2,619,370 | 11/1952 | Leger | 293—2 XR |
| 2,871,799 | 2/1959 | King | 104—172 |
| 3,027,850 | 4/1962 | Burrows | 104—162 XR |
| 3,119,347 | 1/1964 | Dehne | 293—8 XR |
| 3,130,685 | 4/1964 | Goodrich et al. | 104—172 |

ARTHUR L. LA POINT, *Primary Examiner.*

H. BELTRAN, *Assistant Examiner.*